US011441061B2

(12) United States Patent
Amanullah et al.

(10) Patent No.: US 11,441,061 B2
(45) Date of Patent: *Sep. 13, 2022

(54) WATER-BASED DRILLING FLUID COMPOSITIONS AND METHODS FOR DRILLING SUBTERRANEAN WELLS

(71) Applicant: Saudi Arabian Oil Company, Dhahran (SA)

(72) Inventors: Md Amanullah, Dhahran (SA); Raed Alouhali, Dhahran (SA); Sara Alkhalaf, Al Khobar (SA); Ali Radhwan, Anak (SA); Mohammed Khalid Al-Arfaj, Dammam (SA); Abdulaziz S. Al-Qasim, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,802

(22) Filed: Feb. 24, 2021

(65) Prior Publication Data

US 2021/0179914 A1   Jun. 17, 2021

Related U.S. Application Data

(62) Division of application No. 16/672,967, filed on Nov. 4, 2019, now Pat. No. 11,286,412.

(51) Int. Cl.
*C09K 8/20* (2006.01)
*E21B 21/00* (2006.01)

(52) U.S. Cl.
CPC .............. *C09K 8/206* (2013.01); *E21B 21/00* (2013.01); *C09K 2208/34* (2013.01)

(58) Field of Classification Search
CPC ...... C09K 8/04; C09K 8/206; C09K 2208/34; E21B 21/00
See application file for complete search history.

(56) References Cited

U.S. PATENT DOCUMENTS

| | | |
|---|---|---|
| 4,525,287 A | 6/1985 | Carstensen |
| 4,873,008 A | 10/1989 | Landis et al. |
| 4,954,242 A | 9/1990 | Gruia |
| 4,961,839 A | 10/1990 | Stine et al. |
| 5,120,427 A | 6/1992 | Stine et al. |
| 5,139,644 A | 8/1992 | Gruia |
| 5,139,646 A | 8/1992 | Gruia |
| 5,296,132 A | 3/1994 | Hart |
| 5,389,299 A | 2/1995 | Hart |
| 6,624,124 B2 | 9/2003 | Garmier |
| 6,806,235 B1 | 10/2004 | Mueller et al. |
| 7,373,977 B1 | 5/2008 | Berger et al. |
| 8,343,334 B2 | 1/2013 | Koseoglu |
| 8,403,051 B2 | 3/2013 | Huang et al. |
| 8,828,219 B2 | 9/2014 | Koseoglu |
| 8,877,040 B2 | 11/2014 | Hoehn et al. |
| 9,023,192 B2 | 5/2015 | Koseoglu |
| 9,388,347 B2 | 7/2016 | Ramaseshan et al. |
| 9,394,493 B2 | 7/2016 | Koseoglu |
| 9,534,179 B2 | 1/2017 | Koseoglu |
| 9,580,663 B2 | 2/2017 | Low et al. |
| 9,663,732 B2 | 5/2017 | Ganyu |
| 9,701,912 B2 | 7/2017 | Hoehn et al. |
| 9,783,748 B2 | 10/2017 | Harvey et al. |
| 9,914,889 B2 | 3/2018 | Hoehn et al. |
| 9,944,863 B2 | 4/2018 | Zhang et al. |
| 10,011,786 B1 | 7/2018 | Eizenga et al. |
| 10,053,619 B2 | 8/2018 | Saboowala et al. |
| 10,301,560 B2 | 5/2019 | Wang et al. |
| 10,435,635 B2 | 10/2019 | Hoehn et al. |
| 10,533,142 B2 | 1/2020 | Sauge et al. |
| 2004/0127581 A1 | 7/2004 | Baran, Jr. et al. |
| 2005/0202097 A1 | 9/2005 | Maskin |
| 2007/0042913 A1 | 2/2007 | Hutchins et al. |
| 2007/0287636 A1 | 12/2007 | Heller et al. |
| 2008/0161207 A1 | 7/2008 | Welton et al. |
| 2011/0071060 A1 | 3/2011 | Nguyen |

(Continued)

FOREIGN PATENT DOCUMENTS

| | | |
|---|---|---|
| EP | 308651 A2 | 3/1989 |
| EP | 0770661 A1 | 5/1997 |

(Continued)

OTHER PUBLICATIONS

Andersson et al., "First-Principles Prediction of Liquid/Liquid Interfacial Tension", Journal of Chemical Theory and Computation, vol. 10, pp. 3401-3408, May 28, 2014.

Rudyk et al., "Supercritical carbon dioxide extraction of oil sand enhanced by water and alcohols as Co-solvents", Journal of CO2 Utilization, vol. 17, pp. 90-98, 2017.

Veronina et al., "Physical foaming of fluorinated ethylene-propylene (FEP) copolymers in supercritical carbon dioxide: single-film fluoropolymer piezoelectrets", Applied Physics A, vol. 90, pp. 615-618, 2008.

(Continued)

*Primary Examiner* — Aiqun Li
(74) *Attorney, Agent, or Firm* — Dinsmore & Shohl LLP

(57) ABSTRACT

According to one or more embodiments of the present disclosure, water-based drilling fluids may include an aqueous base fluid and one or more additives. In embodiments, water-based drilling fluids may include a lubricant blend including at least oleic acid and palmitoleic acid. The sum of the volume percent of the oleic acid and palmitoleic acid may be from 0.1 vol. % to 10 vol. % of the total volume of the water-based drilling fluid. In embodiments, water-based drilling fluids may include a lesser melting point fraction of jojoba oil in an amount of from 0.1 vol. % to 10 vol. % relative to the total volume of the water-based drilling fluid. At least 90% of the lesser melting point fraction of jojoba oil may have a melting point less than or equal to 15° C. Methods for drilling subterranean wells with the water-based drilling fluids are also disclosed.

7 Claims, No Drawings

(56) References Cited

U.S. PATENT DOCUMENTS

| | | |
|---|---|---|
| 2013/0109879 A1 | 5/2013 | Berger et al. |
| 2015/0159071 A1 | 6/2015 | Massey et al. |
| 2017/0121585 A1 | 5/2017 | Hossain |
| 2017/0137689 A1 | 5/2017 | Deroo |
| 2017/0198201 A1 | 7/2017 | Chang |
| 2018/0057732 A1 | 3/2018 | Babcock |
| 2018/0223167 A1 | 8/2018 | AlBahrani et al. |
| 2018/0223175 A1 | 8/2018 | Al-Yami et al. |
| 2018/0346798 A1 | 12/2018 | Abdel-Fattah et al. |
| 2019/0048287 A1 | 2/2019 | Long et al. |
| 2019/0055459 A1 | 2/2019 | Zelenev et al. |

FOREIGN PATENT DOCUMENTS

| | | |
|---|---|---|
| JP | 4567445 B2 | 10/2010 |
| RU | 2623380 C1 | 6/2017 |
| WO | 2004053016 A1 | 6/2004 |
| WO | 2004101955 A1 | 11/2004 |
| WO | 2010065634 A2 | 6/2010 |
| WO | 2015135777 A2 | 9/2015 |
| WO | 2016138072 A1 | 9/2016 |
| WO | 2018005341 A1 | 1/2018 |
| WO | 2018081063 A1 | 5/2018 |
| WO | 2018144277 A1 | 8/2018 |
| WO | 2019175649 A1 | 9/2019 |
| WO | 2021091631 A1 | 5/2021 |

OTHER PUBLICATIONS

Zhang et al., "Dissolution of surfactants in supercritical CO2 with co-solvents", Chemical Engineering Research and Design, vol. 94, pp. 624-631, 2015.

Office Action dated Nov. 24, 2020 pertaining to U.S. Appl. No. 16/672,967, filed Nov. 4, 2019, 11 pgs.

Office Action dated Aug. 18, 2020 pertaining to U.S. Appl. No. 16/672,967, filed Nov. 4, 2019, 8 pgs.

Busson-Breysse, "Jojoba was: Its esters and some of its minor components", Journal of the American Oil Chemists' Society, vol. 71, No. 9, pp. 999-1002, Sep. 1994.

International Search Report and Written Opinion dated Jan. 21, 2021 pertaining to International application No. PCT/US2020/053253 filed Sep. 29, 2020, 18 pgs.

Youssif, Ahmed A A et al. "Production of Bio Lubricant from Jojoba Oil Synthesis and Characteristic of Carboxymethyl Cellulose from Baobab (*Adansonia Digitata* L.) Fruit Shell View project", International Journal of Engineering Innovation & Research vol. 8, Issue 4, ISSN: 2277-5668, Jul. 17, 2019, pp. 146-153.

Abobatta, Waleed F. "Simmondsia chinensis Jojoba tree", Journal of Advanced Trends in Basic and Applied Science, vol. 1, No. 1:160-165, 2017.

U.S. Office Action dated Dec. 8, 2021 pertaining to U.S. Appl. No. 17/073,741, filed Oct. 19, 2020, 32 pages.

U.S. Office Action dated Jul. 20, 2021 pertaining to U.S. Appl. No. 16/672,967, filed Nov. 4, 2019, 10 pages.

Dubois, V. et al., "Fatty acid profiles of 80 vegetable oils with regard to their nutritional potential", Eur. J. Lipid Sci. Technol. 109 (2007), pp. 710-732 (Year: 2007).

Product data sheets of linolenic acid by Sigma-Aldrich (Year: 2020).

Product data sheets of linoleic acid by Millipore-Sigma (Year: 2020).

International Search Report and Written Opinion dated Apr. 1, 2021 pertaining to International application No. PCT/US2020/066302 filed Dec. 21, 2020, 14 pgs.

U.S. Office Action dated Sep. 13, 2021 pertaining to U.S. Appl. No. 16/922,088, filed Jul. 7, 2020, 48 pages.

U.S. Notice of Allowance and Fee(s) Due dated Nov. 15, 2021 pertaining to U.S. Appl. No. 16/672,967, filed Nov. 4, 2019, 10 pages.

International Search Report and Written Opinion dated Feb. 28, 2022 pertaining to International application No. PCT/US2021/054360 filed Oct. 11, 2021, 14 pages.

U.S. Notice of Allowance and Fee(s) Due dated Mar. 29, 2022 pertaining to U.S. Appl. No. 17/073,741, filed Oct. 19, 2020, 24 pages.

International Search Report and Written Opinion dated Jan. 27, 2022 pertaining to International application No. PCT/US2021/052769 filed Sep. 30, 2021, 15 pages.

U.S. Office Action dated Mar. 15, 2022 pertaining to U.S. Appl. No. 16/922,088, filed Jul. 7, 2020, 34 pages.

WATER-BASED DRILLING FLUID COMPOSITIONS AND METHODS FOR DRILLING SUBTERRANEAN WELLS

CROSS-REFERENCE TO RELATED APPLICATIONS

The present application is a divisional application of U.S. patent application Ser. No. 16/672,967, filed Nov. 4, 2019, the entire contents of which are incorporated by reference in the present disclosure.

BACKGROUND

Field

The present disclosure relates to natural resource well drilling and, more specifically, to water-based drilling fluid compositions and methods for drilling subterranean wells.

Technical Background

Drilling operations, for example, drilling a new wellbore for hydrocarbon extraction, may include the practice of continuously circulating a drilling fluid, also referred to as a drilling mud, through the wellbore during the operation. The drilling fluid may be pumped through the drill string to the bottom of the wellbore, where the drilling fluid then flows upwardly through an annular space between the wellbore wall and the drill pipe and finally returns to the surface and flows out of the wellbore where it may be recovered. During drilling, solids, such as portions of the drilled geological formation referred to as cuttings, may be transported by the drilling fluid from at or near the bottom of the wellbore to the surface. After its return to the surface, the drilling fluid may be mechanically or chemically treated to remove captured solids from the drilling fluid before recirculation back through the wellbore.

SUMMARY

One objective of a drilling fluid may be the reduction of friction between the drill string and the casing or the wellbore wall by acting as a lubricating medium between the metal-metal interface and the metal-mudcake interface while drilling. Some conventional water-based drilling fluids may have poor lubricating properties and, thus, may have a much greater coefficient of friction compared to oil-based drilling fluids. This is one of the major technical limitations of water-based drilling fluids compared to oil-based drilling fluids. To minimize the frictional resistance or coefficient of friction value of water-based drilling fluids, lubricating additives may be incorporated into the drilling fluids. However, many of these conventional additives have limited applicability. For example, some conventional additives have a limited capacity to reduce the coefficient of friction of drilling fluids in downhole operations. Additionally, some conventional additives lack the requisite thermal and chemical stability. Furthermore, some conventional additives are poorly biodegradable, toxic, or not "ecologically-friendly" and, as such, have restricted applications for ecologically sensitive environments. Additionally, some conventional additives lack sufficient stability in relatively cold temperatures (such as, 60 degrees Celsius (° C.) or less, 30° C. or less, or 15° C. or less). For example, while conventional additives may operate as effective lubricants at warmer temperatures (such as, at least 60° C.), these lubricants may be susceptible to solidifying in cold temperatures. As such, these lubricants may lose effectiveness during storage, during delays in operation, or during operations that occur in cold temperatures.

Accordingly, there are ongoing needs for improved water-based drilling fluid compositions and methods for drilling subterranean wells. The compositions and methods of the present disclosure include a water-based drilling fluid that includes a lubricant blend. The lubricant blend may, for example, reduce the coefficient of friction of drilling fluids while also minimizing negative impact to the surrounding environment. The lubricant blend may also effectively operate in cold temperatures (such as 60° C. or less, 30° C. or less, or 15° C. or less). As a result, the water-based drilling fluids of the present disclosure may provide operability in cold environments, and may have superior lubrication properties when compared to some water-based drilling fluids without lubricants and water-based drilling fluids incorporating conventional lubricants.

According to one or more embodiments of the present disclosure, a water-based drilling fluid may include an aqueous base fluid, one or more additives, and a lubricant blend including at least oleic acid and palmitoleic acid. The sum of the volume percent of the oleic acid and palmitoleic acid may be from 0.1 volume percent (vol. %) to 10 vol. % of the total volume of the water-based drilling fluid.

According to one or more additional embodiments of the present disclosure, a water-based drilling fluid may include an aqueous base fluid, one or more additives, and a lesser melting point fraction of jojoba oil in an amount of from 0.1 vol. % to 10 vol. % relative to the total volume of the water-based drilling fluid. At least 90 percent (%) of the lesser melting point fraction of jojoba oil may have a melting point less than or equal to 15° C.

According to one or more additional embodiments of the present disclosure, a method for drilling a subterranean well may include operating a drill in a subterranean formation in the presence of a water-based drilling fluid. The water-based drilling fluid may include an aqueous base fluid, one or more additives, and a lubricant blend comprising at least oleic acid and palmitoleic acid. The sum of the volume percent of the oleic acid and palmitoleic acid may be from 0.1 vol. % to 10 vol. % of the total volume of the water-based drilling fluid.

According to one or more additional embodiments of the present disclosure, a method for drilling a subterranean well may include operating a drill in a subterranean formation in the presence of a water-based drilling fluid. The water-based drilling fluid may include an aqueous base fluid, one or more additives, and a lesser melting point fraction of jojoba oil in an amount of from 0.1 vol. % to 10 vol. % relative to the total volume of the water-based drilling fluid. At least 90% of the lesser melting point fraction of jojoba oil may have a melting point less than or equal to 15° C.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

DETAILED DESCRIPTION

The present disclosure is directed to water-based drilling fluid compositions and, additionally, to methods for drilling a subterranean well using such water-based drilling fluid compositions. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To extract hydrocarbons from the hydrocarbon regions of the subterranean formation, production wells are drilled. The wellbore of production wells may serve to connect hydrocarbon regions of the subterranean formation to the surface and enable hydrocarbons to travel from the subterranean formation to the surface. As used in the present disclosure, the term "wellbore" may refer to the drilled hole or borehole, including the openhole or uncased portion of the well.

According to one or more embodiments, to drill a subterranean well, a drill string is inserted into a pre-drilled hole and rotated to cut into the rock at the bottom of the hole, producing cuttings. Drilling fluids, also referred to as drilling muds, may be pumped down through the drill string during drilling to remove cuttings from the bottom of the subterranean well. Drilling fluids may lift cuttings away from the bottom of the subterranean well when recirculated back to the surface. Drilling fluids may also serve a number of additional functions as well. For example, drilling fluids may also provide hydrostatic pressure in the subterranean well sufficient to support the sidewalls of the subterranean well. This hydrostatic pressure may prevent the sidewalls from collapsing and caving in on the drill string as well as prevent fluids present in the subterranean formation from flowing into the subterranean well during drilling.

In one or more embodiments, the present disclosure is directed to water-based drilling fluids that include an aqueous base fluid one or more additives and a lubricant blend. In embodiments, the lubricant blend may include at least oleic acid and palmitoleic acid such that the sum of the volume percent of the oleic acid and palmitoleic acid may be from 0.1 vol. % to 10 vol. % of the total volume of the water-based drilling fluid. In embodiments, the lubricant blend may include a lesser melting point fraction of jojoba oil in an amount of from 0.1 vol. % to 10 vol. % relative to the total volume of the water-based drilling fluid. At least 90% of the lesser melting point fraction of jojoba oil may have a melting point less than or equal to 15° C. Embodiments of the presently disclosed water-based drilling fluids may be formulated to provide improved lubricity. This formulation may have, in one or more embodiments, the same or a reduced coefficient of friction when compared to conventional lubricants suitable for water-based drilling fluids, while also being suitable for use in relatively cold temperatures (for example, 60° C. or less, 30° C. or less, or 15° C. or less).

As stated previously in the present disclosure, the water-based drilling fluid may include an aqueous base fluid. As used in the present disclosure, the term "aqueous" may refer to a fluid or solution that includes water as the major constituent. In embodiments, the aqueous base fluid may include at least one of fresh water, salt water, brine, municipal water, formation water, produced water, well water, filtered water, distilled water, seawater, or combinations of these. The brine may include at least one of natural and synthetic brine, such as saturated brine or formate brine. Without being bound by any particular theory, it is believed that brine may be used to create osmotic balance between the water-based drilling fluid and the subterranean formation.

In embodiments, the aqueous base fluid may include water containing organic compounds or salt. Without being bound by any particular theory, salt or other organic compounds may be incorporated into the aqueous base fluid to control the density of the water-based drilling fluid. Increasing the saturation of the aqueous base fluid by increasing the salt concentration or the level of other organic compounds in the aqueous base fluid may increase the density of the water-based drilling fluid. Suitable salts include but are not limited to alkali metal chlorides, hydroxides, or carboxylates. For example, in embodiments the aqueous base fluid may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these.

In embodiments, the water-based drilling fluid may include an aqueous base fluid in an amount of from 25 volume percent (vol. %) to 99 vol. % relative to the total volume of the water-based drilling fluid. For example, the water-based drilling fluid may include an aqueous base fluid in an amount of from 25 vol. % to 95 vol. %, from 25 vol. % to 85 vol. %, from 25 vol. % to 75 vol. %, from 25 vol. % to 65 vol. %, from 25 vol. % to 55 vol. %, from 25 vol. % to 45 vol. %, from 25 vol. % to 35 vol. %, from 35 vol. % to 99 vol. %, from 35 vol. % to 95 vol. %, from 35 vol. % to 85 vol. %, from 35 vol. % to 75 vol. %, from 35 vol. % to 65 vol. %, from 35 vol. % to 55 vol. %, from 35 vol. % to 45 vol. %, from 45 vol. % to 99 vol. %, from 45 vol. % to 95 vol. %, from 45 vol. % to 85 vol. %, from 45 vol. % to 75 vol. %, from 45 vol. % to 65 vol. %, from 45 vol. % to 55 vol. %, from 55 vol. % to 99 vol. %, from 55 vol. % to 95 vol. %, from 55 vol. % to 85 vol. %, from 55 vol. % to 75 vol. %, from 55 vol. % to 65 vol. %, from 65 vol. % to 99 vol. %, from 65 vol. % to 95 vol. %, from 65 vol. % to 85 vol. %, from 65 vol. % to 75 vol. %, from 75 vol. % to 99 vol. %, from 75 vol. % to 95 vol. %, from 75 vol. % to 85 vol. %, from 85 vol. % to 99 vol. %, from 85 vol. % to 95 vol. %, or from 95 vol. % to 99 vol. % relative to the total volume of the water-based drilling fluid.

As stated previously in the present disclosure, the water-based drilling fluid may include a lubricant blend. Lubricant blends may be used to increase the lubricity (that is, decrease the coefficient of friction) of the water-based drilling fluid, decrease friction between the drill string and the wellbore during drilling operations, or both. A decrease of the coefficient of friction of the water-based drilling fluid containing the lubricant may provide a reduction in friction experienced between the drilling components and the wellbore, such as the drill string and the wellbore. The coefficient of friction may be measured in accordance with a standard lubricity coefficient test. A lubricity testing device commonly used by those in the drilling fluid industry (for example, OFI Testing Equipment, Inc. (OFITE), Houston, Tex.) may be utilized for measuring the coefficient of friction. In embodiments, the water-based drilling fluid may include a lubricant blend in an amount sufficient for the water-based drilling fluid to achieve a coefficient of friction of from 0.01 to 0.15. For example, the water-based drilling fluid may include a lubricant blend in an amount sufficient for the water-based drilling fluid to achieve a coefficient of friction of from 0.01 to 0.12, from 0.01 to 0.09, from 0.01 to 0.06, from 0.01 to 0.03, from 0.03 to 0.15, from 0.03 to 0.12, from 0.03 to 0.09, from 0.03 to 0.06, from 0.06 to 0.15, from 0.06 to 0.12, from 0.06 to 0.09, from 0.09 to 0.15, from 0.09 to 0.12, or from 0.12 to 0.15.

In embodiments, the lubricant blend may include one or more fatty acids. As presently described, the lubricant blend may include a substantial majority of or all of the fatty acids in the water-based drilling fluid into which the lubricant blend may be incorporated. For example, the lubricant blend may include greater than or equal to 90%, greater than or equal to 95%, greater than or equal to 99% or greater than or equal to 99.9% of the fatty acids in the water-based drilling fluid into which the lubricant blend may be incorporated. In embodiments, the lubricant blend may include long-chain fatty acids. As used in this disclosure, the term "long-chain fatty acid" refers to carboxylic acids that have an aliphatic tail of from 13 carbon atoms to 21 carbon atoms. That is, a long-chain fatty acid is a non-aromatic carboxylic acid that includes a main chain or "backbone" of from 13 carbon atoms to 21 carbon atoms, excluding branched sidechains. For example, palmitic acid ($CH_3(CH_2)_{14}COOH$) is a fatty acid that has an aliphatic tail of 16 carbon atoms and stearic acid ($CH_3(CH_2)_{16}COOH$) is a fatty acid that has an aliphatic tail of 18 carbon atoms. Long-chain fatty acids may have an aliphatic tail that is saturated or unsaturated, straight chain (unbranched) or branched, unsubstituted or heteroatom-substituted, or combinations of these. Fatty acids may enhance the capacity of the lubricant blend to decrease the coefficient of friction of the water-based drilling fluid. When fatty acids are homogenously dispersed within the water-based drilling fluid, the fatty acids may improve the interface penetration capacity of the water-based drilling fluid to create a thin but strong lubricating film on the surfaces of the drilling components.

In embodiments, the lubricant blend may include oleic acid, palmitoleic acid, or both. In embodiments, the sum of the volume percent of the oleic acid and the palmitoleic acid may be from 0.1 vol. % to 10 vol. % of the total volume of the water-based drilling fluid. For example, the sum of the volume percent of the oleic acid and the palmitoleic acid may be from 0.1 vol. % to 8 vol. %, from 0.1 vol. % to 6 vol. %, from 0.1 vol. % to 4 vol. %, from 0.1 vol. % to 2 vol. %, from 2 vol. % to 10 vol. %, from 2 vol. % to 8 vol. %, from 2 vol. % to 6 vol. %, from 2 vol. % to 4 vol. %, from 4 vol. % to 10 vol. %, from 4 vol. % to 8 vol. %, from 4 vol. % to 6 vol. %, from 6 vol. % to 10 vol. %, from 6 vol. % to 8 vol. %, or from 8 vol. % to 10 vol. % of the total volume of the water-based drilling fluid. In embodiments, the molar ratio of oleic acid to palmitoleic acid present within the lubricant blend may be from 25:1 to 50:1. For example, the molar ratio of oleic acid to palmitoleic acid present within the lubricant blend may be from 25:1 to 45:1, from 25:1 to 40:1, from 25:1 to 35:1, from 25:1 to 30:1, from 30:1 to 50:1, from 30:1 to 45:1, from 30:1 to 40:1, from 30:1 to 35:1, from 35:1 to 50:1, from 35:1 to 45:1, from 35:1 to 40:1, from 40:1 to 50:1, from 40:1 to 45:1, or from 45:1 to 50:1.

In embodiments, the oleic acid of the lubricant blend, the palmitoleic acid of the lubricant blend, or both, may be derived from jojoba oil. As used in the present disclosure, the term "derived" may refer to the processing of jojoba oil to produce a lubricant blend that includes oleic acid, palmitoleic acid, or both. For example, the lubricant blend may include or consist essentially of a lesser melting point fraction of jojoba oil. As used in the present disclosure, a "lesser melting point fraction" may refer to the portion of jojoba oil that remains in a liquid phase at a particular temperature. Jojoba oil is the oil extracted from the seeds of the jojoba plant (*Simmondsia chinensis*) and is composed almost entirely of mono-esters of long-chain fatty acids with only small amounts of triglyceride esters. As previously stated, long-chain fatty acids may enhance the capacity of the lubricant blend to reduce the coefficient of friction of the water-based drilling fluid. However, the majority of the fatty acids of jojoba oil (for example, gondoic acid and erucic acid) have melting points greater than 15° C. As a result, jojoba oil readily forms solids at relatively mild temperatures (for example, from 20° C. to 25° C.). These solidified fatty acids may fail to provide an effective increase in lubricity of the water-based drilling fluid. Without being bound by any particular theory, it is believed that the solid particles may prevent the formation of a lubricating film on the surfaces of the drilling components. In embodiments, at least 90% of the lesser boiling point fraction of jojoba oil may have a melting point less than or equal to 15° C. For example, at least 90% of the lesser melting point fraction of jojoba oil may have a melting point less than or equal to 12° C., less than or equal to 9° C., less than or equal to 6° C., less than or equal to 3° C., or less than or equal to 0° C. Additionally, in embodiments at least 92%, at least 94%, at least 96%, at least 98%, or at least 99% of the lesser boiling point fraction of jojoba oil may have a melting point less than or equal to 15° C. In embodiments, the water-based drilling fluid may include the lesser melting point fraction of jojoba oil in an amount of from 0.1 vol. % to 10 vol. % relative to the total volume of the water-based drilling fluid. For example, the water-based drilling fluid may include the lesser melting point fraction of jojoba oil in an amount of from 0.1 vol. % to 8 vol. %, from 0.1 vol. % to 6 vol. %, from 0.1 vol. % to 4 vol. %, from 0.1 vol. % to 2 vol. %, from 2 vol. % to 10 vol. %, from 2 vol. % to 8 vol. %, from 2 vol. % to 6 vol. %, from 2 vol. % to 4 vol. %, from 4 vol. % to 10 vol. %, from 4 vol. % to 8 vol. %, from 4 vol. % to 6 vol. %, from 6 vol. % to 10 vol. %, from 6 vol. % to 8 vol. %, or from 8 vol. % to 10 vol. % relative to the total volume of the water-based drilling fluid.

In embodiments, the lesser melting point fraction of jojoba oil may include oleic acid, palmitoleic acid, or both. In embodiments, the lesser melting point fraction of jojoba oil may include oleic acid in an amount of from 75 vol. % to 99 vol. % relative to the total volume of the lesser melting point fraction of jojoba oil. For example the lesser melting point fraction of jojoba oil may include oleic acid in an amount of from 75 vol. % to 95 vol. %, from 75 vol. % to 90 vol. %, from 75 vol. % to 85 vol. %, from 75 vol. % to 80 vol. %, from 80 vol. % to 99 vol. %, from 80 vol. % to 95 vol. %, from 80 vol. % to 90 vol. %, from 80 vol. % to 85 vol. %, from 85 vol. % to 99 vol. %, from 85 vol. % to 95 vol. %, from 85 vol. % to 90 vol. %, from 90 vol. % to 99 vol. %, from 90 vol. % to 95 vol. %, or from 95 vol. % to 99 vol. % relative to the total volume of the lesser melting point fraction of jojoba oil. In embodiments, the lesser melting point fraction of jojoba oil may include palmitoleic acid in an amount of from 1 vol. % to 25 vol. % relative to the total volume of the lesser melting point fraction of jojoba oil. For example, the lesser melting point fraction of jojoba oil may include palmitoleic acid in an amount of from 1 vol. % to 20 vol. %, from 1 vol. % to 15 vol. %, from 1 vol. % to 10 vol. %, from 1 vol. % to 5 vol. %, from 5 vol. % to 25 vol. %, from 5 vol. % to 20 vol. %, from 5 vol. % to 15 vol. %, from 5 vol. % to 10 vol. %, from 10 vol. % to 25 vol. %, from 10 vol. % to 20 vol. %, from 10 vol. % to 15 vol. %, from 15 vol. % to 25 vol. %, from 15 vol. % to 20 vol. %, or from 20 vol. % to 25 vol. % relative to the total volume of the lesser melting point fraction of jojoba oil. In embodiments, the molar ratio of oleic acid to palmitoleic acid present within the lesser melting point fraction of jojoba oil may be from 25:1 to 50:1. For example, the molar ratio of oleic acid to palmitoleic acid present within the lesser melting point fraction of jojoba oil may be from 25:1 to 45:1, from 25:1 to 40:1, from 25:1 to 35:1, from 25:1 to 30:1, from 30:1 to 50:1, from 30:1 to 45:1, from 30:1 to 40:1, from 30:1 to 35:1, from 35:1 to 50:1, from 35:1 to 45:1, from 35:1 to 40:1, from 40:1 to 50:1, from 40:1 to 45:1, or from 45:1 to 50:1.

In embodiments, the water-based drilling fluid may be formulated to have specific characteristics, such as increased viscosity and density. For example, the water-based drilling fluid may be formulated to have a density in a range suitable to provide the necessary hydrostatic pressure to support the sidewalls of the wellbore and prevent fluids in the formation from flowing into the wellbore. Additionally, the water-based drilling fluid may be formulated to have viscosity in a range suitable to allow the water-based drilling fluid to be pumped down through the drill string while still capturing and conveying cuttings from the bottom of the subterranean formation. To accomplish these functions, the water-based drilling fluid may include one or more additives that are suitable for use in water-based drilling fluids. The one or more additive may include alkalinity adjusters, viscosifiers, shale inhibitors, fluid loss control agents, weighting agents, or combinations of these. In embodiments, the water-based drilling fluid may include one or more additives in an amount of from 0.1 vol. % to 75 vol. % relative to the total volume of the water-based drilling fluid. For example, the water-based drilling fluid may include one or more additives in an amount of from 0.1 vol. % to 60 vol. %, from 0.1 vol. % to 45 vol. %, from 0.1 vol. % to 30 vol. % from 0.1 vol. % to 15 vol. %, from 15 vol. % to 75 vol. %, from 15 vol. % to 60 vol. %, from 15 vol. % to 45 vol. %, from 15 vol. % to 30 vol. %, from 30 vol. % to 75 vol. %, from 30 vol. % to 60 vol. %, from 30 vol. % to 45 vol. %, from 45 vol. % to 75 vol. %, from 45 vol. % to 60 vol. %, or from 60 vol. % to 75 vol. % relative to the total volume of the water-based drilling fluid.

As stated previously in the present disclosure, the water-based drilling fluid may include an alkalinity adjuster. Alkalinity adjusters may include alkaline compounds that may be included in water-based drilling fluids to buffer the pH of the water-based drilling fluid. The alkalinity adjuster may react with gases, such as carbon dioxide or hydrogen sulfide, encountered by the water-based drilling fluid during drilling operations to prevent the gases from hydrolyzing components of the water-based drilling fluid. In embodiments, the alkalinity adjuster may include lime (calcium hydroxide or calcium oxide), soda ash (sodium carbonate), sodium hydroxide, potassium hydroxide, or combinations of these. The water-based drilling fluid may include an alkalinity adjuster in an amount sufficient to adjust the pH of the water-based drilling fluid to a desired level. In embodiments, the water-based drilling fluid may include an alkalinity adjuster in an amount of from 0.1 vol. % to 75 vol. % relative to the total volume of the water-based drilling fluid. For example, the water-based drilling fluid may include an alkalinity adjuster in an amount of from 0.1 vol. % to 60 vol. %, from 0.1 vol. % to 45 vol. %, from 0.1 vol. % to 30 vol. % from 0.1 vol. % to 15 vol. %, from 15 vol. % to 75 vol. %, from 15 vol. % to 60 vol. %, from 15 vol. % to 45 vol. %, from 15 vol. % to 30 vol. %, from 30 vol. % to 75 vol. %, from 30 vol. % to 60 vol. %, from 30 vol. % to 45 vol. %, from 45 vol. % to 75 vol. %, from 45 vol. % to 60 vol. %, or from 60 vol. % to 75 vol. % relative to the total volume of the water-based drilling fluid.

As stated previously in the present disclosure, in embodiments the water-based drilling fluid may include a viscosifier, also referred to as a rheology modifier. Viscosifiers may impart non-Newtonian fluid rheology to the water-based drilling fluid, create a flat viscosity profile of the water-based drilling fluid in annular flow, or both. This may facilitate the lifting and conveying of cuttings from the bottom of the subterranean formation to the surface during drilling of the subterranean well. In embodiments, the viscosifier may include polysaccharides, bentonite, polyacrylamides, polyanionic cellulose, or combinations of these. For example, the viscosifier may include xanthan gum, a polysaccharide also referred to as "XC polymer." The water-based drilling fluid may include a viscosifier in an amount sufficient to impart non-Newtonian fluid rheology to the water-based drilling fluid, create a flat viscosity profile of the water-based drilling fluid in annular flow, or both. In embodiments, the water-based drilling fluid may include a viscosifier in an amount of from 0.1 vol. % to 75 vol. % relative to the total volume of the water-based drilling fluid. For example, the water-based drilling fluid may include a viscosifier in an amount of from 0.1 vol. % to 60 vol. %, from 0.1 vol. % to 45 vol. %, from 0.1 vol. % to 30 vol. % from 0.1 vol. % to 15 vol. %, from 15 vol. % to 75 vol. %, from 15 vol. % to 60 vol. %, from 15 vol. % to 45 vol. %, from 15 vol. % to 30 vol. %, from 30 vol. % to 75 vol. %, from 30 vol. % to 60 vol. %, from 30 vol. % to 45 vol. %, from 45 vol. % to 75 vol. %, from 45 vol. % to 60 vol. %, or from 60 vol. % to 75 vol. % relative to the total volume of the water-based drilling fluid. In instances where a polymer-based viscosifier is used, the water-based drilling fluid may further include a thermal stabilizer, such as sodium sulfite, which may prevent the thermal degradation of the viscosifier at increased temperatures, such as those downhole of the wellbore. In embodiments, the water-based drilling fluid may include a thermal stabilizer in an amount of from 0.1 vol. % to 10 vol. % relative to the total volume of the water-based drilling fluid. For example, the water-based drilling fluid may include a thermal stabilizer in an amount of from 0.1 vol. % to 8 vol. %, from 0.1 vol. % to 6 vol. %, from 0.1 vol. % to 4 vol. % from 0.1 vol. % to 2 vol. %, from 2 vol. % to 10 vol. %, from 2 vol. % to 8 vol. %, from 2 vol. % to 6 vol. %, from 2 vol. % to 4 vol. %, from 4 vol. % to 10 vol. %, from 4 vol. % to 8 vol. %, from 4 vol. % to 6 vol. %, from 6 vol. % to 10 vol. %, from 6 vol. % to 8 vol. %, or from 8 vol. % to 10 vol. % relative to the total volume of the water-based drilling fluid.

As stated previously in the present disclosure, the water-based drilling fluid may include a shale inhibitor. Shale inhibitors, also referred to as clay stabilizers or swelling inhibitors, may prevent the swelling and hydration of water-sensitive subterranean formation, such as shale formations. Shale inhibitors may attach to the surface of the subterranean formation and lend stability to the formation exposed to the water-based drilling fluid as well as prevent cuttings from dispersing into finer particles. The shale inhibitor may include sodium chloride, potassium chloride, potassium carbonate, potassium lignite, calcium chloride, sodium asphalt sulfonate (commercially available as SOLTEX® from Chevron Phillips Chemical Company), or combinations of these. The water-based drilling fluid may include a shale inhibitor in an amount sufficient to prevent the swelling and hydration of the subterranean formation. In embodiments, the water-based drilling fluid may include a shale inhibitor in an amount of from 0.1 vol. % to 75 vol. % relative to the total volume of the water-based drilling fluid. For example, the water-based drilling fluid may include a shale inhibitor in an amount of from 0.1 vol. % to 60 vol. %, from 0.1 vol. % to 45 vol. %, from 0.1 vol. % to 30 vol. % from 0.1 vol. % to 15 vol. %, from 15 vol. % to 75 vol. %, from 15 vol. % to 60 vol. %, from 15 vol. % to 45 vol. %, from 15 vol. % to 30 vol. %, from 30 vol. % to 75 vol. %, from 30 vol. % to 60 vol. %, from 30 vol. % to 45 vol. %, from 45 vol. % to 75 vol. %, from 45 vol. % to 60 vol. %, or from 60 vol. % to 75 vol. % relative to the total volume of the water-based drilling fluid.

As stated previously in the present disclosure, in embodiments the water-based drilling fluid may include a fluid loss control agent. Fluid loss control agents may reduce or prevent the leakage of the liquid phase of the water-based drilling fluid into the subterranean formation. This leakage may result in an undesirable buildup of solid material present in the water-based drilling fluid, damage to the subterranean formation, or both. In embodiments, the fluid loss control agent may include starch, carboxymethyl starch, carboxymethylcellulose, sodium asphalt sulfonate (commercially available as SOLTEX® from Chevron Phillips Chemical Company), or combinations of these. The water-based drilling fluid may include a fluid loss control agent in an amount sufficient to reduce or prevent the leakage of the liquid phase of the water-based drilling fluid into the subterranean formation. In embodiments, the water-based drilling fluid may include a fluid loss control agent in an amount of from 0.1 vol. % to 75 vol. % relative to the total volume of the water-based drilling fluid. For example, the water-based drilling fluid may include a fluid loss control agent in an amount of from 0.1 vol. % to 60 vol. %, from 0.1 vol. % to 45 vol. %, from 0.1 vol. % to 30 vol. % from 0.1 vol. % to 15 vol. %, from 15 vol. % to 75 vol. %, from 15 vol. % to 60 vol. %, from 15 vol. % to 45 vol. %, from 15 vol. % to 30 vol. %, from 30 vol. % to 75 vol. %, from 30 vol. % to 60 vol. %, from 30 vol. % to 45 vol. %, from 45 vol. % to 75 vol. %, from 45 vol. % to 60 vol. %, or from 60 vol. % to 75 vol. % relative to the total volume of the water-based drilling fluid.

As stated previously in the present disclosure, in embodiments the water-based drilling fluid may include a weighting agent. Weighting agents may include finely divided solid particles that may be dispersed in the water-based drilling fluid. Weighting agents may increase the density of the water-based drilling fluid to support the sidewalls of the wellbore. Weighting agents may also increase the hydrostatic pressure of the water-based drilling fluid to reduce or prevent fluids present in the subterranean formation from flowing into the wellbore. In embodiments, the weighting agent may include barite, hematite, calcium carbonate, siderite, ilmenite, or combinations of these. In embodiments, the water-based drilling fluid may include a weighting agent in an amount sufficient for the water-based drilling fluid to achieve a density of from 50 pounds per cubic foot (pcf) to 150 pcf, as measured in accordance with the American Petroleum Institute (API) recommended practice 13B-1. For example, the water-based drilling fluid may include a weighting agent in an amount sufficient for the water-based drilling fluid to achieve a density of from 50 pcf to 125 pcf, from 50 pcf to 100 pcf, from 50 pcf to 75 pcf, from 75 pcf to 150 pcf, from 75 pcf to 125 pcf, from 75 pcf to 100 pcf, from 100 pcf to 150 pcf, from 100 pcf to 125 pcf, or from 125 pcf to 150 pcf. In embodiments, the water-based drilling fluid may include a weighting agent in an amount of from 0.1 vol. % to 75 vol. % relative to the total volume of the water-based drilling fluid. For example, the water-based drilling fluid may include a weighting agent in an amount of from 0.1 vol. % to 60 vol. %, from 0.1 vol. % to 45 vol. %, from 0.1 vol. % to 30 vol. % from 0.1 vol. % to 15 vol. %, from 15 vol. % to 75 vol. %, from 15 vol. % to 60 vol. %, from 15 vol. % to 45 vol. %, from 15 vol. % to 30 vol. %, from 30 vol. % to 75 vol. %, from 30 vol. % to 60 vol. %, from 30 vol. % to 45 vol. %, from 45 vol. % to 75 vol. %, from 45 vol. % to 60 vol. %, or from 60 vol. % to 75 vol. % relative to the total volume of the water-based drilling fluid.

The present disclosure is also directed to the use of the water-based drilling fluid in drilling operations, such as drilling a subterranean well. Accordingly, methods for drilling a subterranean well may include operating a drill in a subterranean formation in the presence of a water-based drilling fluid. The water-based drilling fluid may be in accordance with any of the embodiments previously described in the present disclosure. In embodiments, the water-based drilling fluid may be introduced into the subterranean formation. Introducing the water-based drilling fluid may involve injecting the drilling fluid into the subterranean formation. In embodiments, the drilling fluid may be injected through a drill string of the drill to a drill bit. In embodiments, the subterranean formation may be a subterranean well. The water-based drilling fluid may at least be partially circulated within the subterranean formation. Recirculating the water-based drilling fluid may allow the water-based drilling fluid to cool and lubricate the drill bit and to lift cuttings away from the drill bit, carrying the cuttings upward to the surface to clean the wellbore. The water-based drilling fluid may additionally provide hydrostatic pressure to support the sidewalls of the wellbore and prevent the sidewalls from collapsing onto the drill string.

Further embodiments of the present disclosure may relate to particular methods of preparing the water-based drilling fluid. The method may include processing jojoba oil to produce the lesser melting point fraction of jojoba, as described previously in the present disclosure. In embodiments, the processing of jojoba oil may include screening, chilling, filtering, or combinations of these. The screening of jojoba oil may include passing the jojoba oil through a sieve. In embodiments, the sieve may have an average pore size less than or equal to 100 microns. For example, the sieve may have an average pore size less than or equal to 90 microns, less than or equal to 80 microns, less than or equal to 70 microns, less than or equal to 60 microns, or less than or equal to 50 microns. The chilling of jojoba oil may include reducing the temperature of jojoba oil to a temperature sufficient to solidify at least a fraction of the jojoba oil. In embodiments, the temperature of the jojoba oil may be reduced to less than or equal to 15° C. For example, the temperature of the jojoba oil may be reduced to less than or equal to 12° C., less than or equal to 9° C., less than or equal to 6° C., less than or equal to 3° C., or less than or equal to 0° C. The filtering of jojoba oil may include separating a liquid phase of the jojoba oil from a solid phase of the jojoba oil. The method may also include mixing the lesser melting point fraction of jojoba oil with an aqueous base fluid and one or more additives. The aqueous base fluid, the one or more additives, and the lesser melting point fraction of jojoba oil may each be provided in accordance with any of the embodiments previously described in the present disclosure.

EXAMPLES

The various embodiments of water-based drilling fluid compositions will be further clarified by the following example. The example is illustrative in nature, and should not be understood to limit the subject matter of the present disclosure.

Example 1—Lubricity of Water-Based Drilling Fluids (without Added Lubricant)

To observe the effects of the presently disclosed lubricant blend in reducing the coefficient of friction of a water-based drilling fluid, two water-based drilling fluids were prepared. The first water-based drilling fluid (Drilling Fluid 1) was prepared by mixing 340 milliliters (ml) of water, 0.25 grams (g) of soda ash, and 25 g of bentonite. The second water-based drilling fluid (Drilling Fluid 2) was prepared by mixing 332 ml of water, 0.3 g of soda ash, 6 g of bentonite, 3 g of polyanionic cellulose, 1 g of xanthan gum, 20 g of potassium chloride, 3 g of sodium asphalt sulfonate, and 1 g of sodium sulfite.

Drilling Fluid 1 and Drilling Fluid 2 were then each tested for a baseline coefficient of friction value without an added lubricant blend. A portion of each water-based drilling fluid was loaded into the lubricity tester, commercially available as "EP and Lubricity Tester" from OFITE, and a test block was subjected to 150 inch-pounds of torque within the water-based drilling fluid for 5 minutes. The composition and measured coefficient of friction of both Drilling Fluid 1 and Drilling Fluid 2 are provided in Table 1.

TABLE 1

|  | Drilling Fluid 1 | Drilling Fluid 2 |
|---|---|---|
| Water (ml) | 340 | 332 |
| Soda Ash (g) | 0.25 | 0.3 |
| Bentonite (g) | 25 | 6 |
| Polyanionic Cellulose (g) | — | 3 |
| Xanthan Gum (g) | — | 1 |
| Potassium Chloride (g) | — | 20 |
| Sodium Asphalt Sulfonate (g) | — | 3 |
| Sodium Sulfite (g) | — | 1 |
| Coefficient of Friction | 0.45 | 0.22 |

Example 2—Production of Lubricant Blend

To prepare a lubricant blend of the present disclosure, seeds of the jojoba plant were crushed and pressed to produce jojoba oil. The jojoba oil was then collected and screened using a sieve having an average pore size less than 74 microns to separate any particulate material larger than 74 microns from the jojoba oil. The jojoba oil was then placed in a chilling chamber until the jojoba oil reached a temperature of 15° C. and a particulate cloud containing solidified fatty acids and particulate material small than 74 microns had formed. The jojoba oil was then pressure filtered using a hardened filter paper having an average pore size of 5 microns and an average pressure of from 10 pounds per square inch (psi) to 20 psi to separate the particulate cloud from the liquid jojoba oil. The screening, chilling, and filtering of the liquid jojoba oil were then conducted two additional times, producing the lubricant blend.

Example 3—Lubricity of Water-Based Drilling Fluids (with Added Lubricant)

Separate samples of both Drilling Fluid 1 and Drilling Fluid 2, as prepared in Example 1, were loaded with the lubricant blend, as prepared in Example 2, diesel oil, and mineral oil. The resulting water-based drilling fluids each included 3 vol. % of a lubricant. A portion of each water-based drilling fluid was loaded into the lubricity tester, commercially available as "EP and Lubricity Tester" from OFITE, and a test block was subjected to 150 inch-pounds of torque within the water-based drilling fluid for 5 minutes. The coefficient of friction measurements for each water-based drilling fluid are provided in Table 2.

TABLE 2

|  | No Lubricant | Lubricant Blend | Diesel Oil | Mineral Oil |
|---|---|---|---|---|
|  |  | Coefficient of Friction |  |  |
| Drilling Fluid 1 | 0.45 | 0.09 | 0.13 | 0.12 |
| Drilling Fluid 2 | 0.22 | 0.13 | 0.14 | 0.14 |

As shown by the results provided in Table 2, the inclusion of 3 vol. % of the disclosed lubricant blend resulted in an 80 percent (%) decrease in the coefficient of friction of Drilling Fluid 1. This decrease in the coefficient of friction was also greater than the decrease achieved by either of the conventional lubricants, diesel oil and mineral oil. Similarly, the inclusion of 3 vol. % of the disclosed lubricant blend also resulted in a 41% decrease in the coefficient of friction of Drilling Fluid 2 compared to the 36% decrease achieved by the conventional lubricants. This indicates that the disclosed lubricant blend is capable of sufficiently decreasing the coefficient of friction of a water-based drilling fluid. Additionally, this indicates that water-based drilling fluids that include the lubricant blend may have a decreased coefficient of friction and, as a result, an increased lubricity when compared to water-based drilling fluids that include conventional lubricants.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims and their equivalents.

In a first aspect of the present disclosure, a water-based drilling fluid may include an aqueous base fluid, one or more additives, and a lubricant blend including at least oleic acid and palmitoleic acid. The sum of the volume percent of the oleic acid and palmitoleic acid may be from 0.1 vol. % to 10 vol. % of the total volume of the water-based drilling fluid.

A second aspect of the present disclosure may include the first aspect where the molar ratio of oleic acid to palmitoleic acid may be from 25:1 to 50:1.

A third aspect of the present disclosure may include either of the first or second aspects where the lubricant blend includes a lesser melting point fraction of jojoba oil. At least 90% of the lesser melting point fraction of jojoba oil may have a melting point less than or equal to 15° C.

A fourth aspect of the present disclosure may include any of the first through third aspects where the one or more additives include at least one of an alkalinity adjuster, a viscosifier, a shale inhibitor, a fluid loss control agent, or a weighting agent.

A fifth aspect of the present disclosure may include any of the first through fourth aspects where the water-based drilling fluid includes the aqueous base fluid in an amount of from 25 vol. % to 99 vol. % relative to the total volume of the water-based drilling fluid.

A sixth aspect of the present disclosure may include any of the first through fifth aspects where the water-based drilling fluid includes the one or more additives in an amount of from 0.1 vol. % to 75 vol. % relative to the total volume of the water-based drilling fluid.

In a seventh aspect of the present disclosure, a water-based drilling fluid may include an aqueous base fluid, one or more additives, and a lesser melting point fraction of jojoba oil in an amount of from 0.1 vol. % to 10 vol. % relative to the total volume of the water-based drilling fluid. At least 90% of the lesser melting point fraction of jojoba oil may have a melting point less than or equal to 15° C.

An eighth aspect of the present disclosure may include the seventh aspect where the lesser melting point fraction of jojoba oil includes at least oleic acid and palmitoleic acid.

A ninth aspect of the present disclosure may include the eighth aspect where the lesser melting point fraction of jojoba oil includes oleic acid in an amount of from 75 vol. % to 99 vol. % relative to the total volume of the lesser melting point fraction of jojoba oil.

A tenth aspect of the present disclosure may include either of the eighth or ninth aspects where the lesser melting point fraction of jojoba oil includes palmitoleic acid in an amount of from 1 vol. % to 25 vol. % relative to the total volume of the lesser melting point fraction of jojoba oil.

An eleventh aspect of the present disclosure may include any of the eighth through tenth aspects where the molar ratio of oleic acid to palmitoleic acid may be from 25:1 to 50:1.

A twelfth aspect of the present disclosure may include any of the seventh through eleventh aspects where the one or more additives include at least one of an alkalinity adjuster, a viscosifier, a shale inhibitor, a fluid loss control agent, or a weighting agent.

A thirteenth aspect of the present disclosure may include any of the seventh through twelfth aspects where the water-based drilling fluid includes the aqueous base fluid in an amount of from 25 vol. % to 99 vol. % relative to the total volume of the water-based drilling fluid.

A fourteenth aspect of the present disclosure may include any of the seventh through thirteenth aspects where the water-based drilling fluid includes one or more additives in an amount of from 0.1 vol. % to 75 vol. % relative to the total volume of the water-based drilling fluid.

In a fifteenth aspect of the present disclosure, a method for drilling a subterranean well may include operating a drill in a subterranean formation in the presence of a water-based drilling fluid. The water-based drilling fluid may include an aqueous base fluid, one or more additives, and a lubricant blend including at least oleic acid and palmitoleic acid. The sum of the volume percent of the oleic acid and palmitoleic acid may be from 0.1 vol. % to 10 vol. % of the total volume of the water-based drilling fluid.

A sixteenth aspect of the present disclosure may include the fifteenth aspect where the molar ratio of oleic acid to palmitoleic acid may be from 25:1 to 50:1.

A seventeenth aspect of the present disclosure may include either of the fifteenth or sixteenth aspects where the lubricant blend includes a lesser melting point fraction of jojoba oil. At least 90% of the lesser melting point fraction of jojoba oil may have a melting point less than or equal to 15° C.

An eighteenth aspect of the present disclosure may include any of the fifteenth through seventeenth aspects where one or more additives include at least one of an alkalinity adjuster, a viscosifier, a shale inhibitor, a fluid loss control agent, or a weighting agent.

A nineteenth aspect of the present disclosure may include any of the fifteenth through eighteenth aspects where the water-based drilling fluid includes the aqueous base fluid in an amount of from 25 vol. % to 99 vol. % relative to the total volume of the water-based drilling fluid.

A twentieth aspect of the present disclosure may include any of the fifteenth through nineteenth aspects where the water-based drilling fluid includes the one or more additives in an amount of from 0.1 vol. % to 75 vol. % relative to the total volume of the water-based drilling fluid.

In a twenty-first aspect of the present disclosure, a method for drilling a subterranean well may include operating a drill in a subterranean formation in the presence of a water-based drilling fluid. The water-based drilling fluid may include an aqueous base fluid, one or more additives, and a lesser melting point fraction of jojoba oil in an amount of from 0.1 vol. % to 10 vol. % relative to the total volume of the water-based drilling fluid. At least 90% of the lesser melting point fraction of jojoba oil may have a melting point less than or equal to 15° C.

A twenty-second aspect of the present disclosure may include the twenty-first aspect where the lesser melting point fraction of jojoba oil includes at least oleic acid and palmitoleic acid.

A twenty-third aspect of the present disclosure may include the twenty-second aspect where the lesser melting point fraction of jojoba oil includes oleic acid in an amount of from 75 vol. % to 99 vol. % relative to the total volume of the lesser melting point fraction of jojoba oil.

A twenty-fourth aspect of the present disclosure may include either of the twenty-second or twenty-third aspects where the lesser melting point fraction of jojoba oil includes palmitoleic acid in an amount of from 1 vol. % to 25 vol. % relative to the total volume of the lesser melting point fraction of jojoba oil.

A twenty-fifth aspect of the present disclosure may include any of the twenty-second through twenty-fourth aspects where the molar ratio of oleic acid to palmitoleic acid may be from 25:1 to 50:1.

A twenty-sixth aspect of the present disclosure may include any of the twenty-first through twenty-fifth aspects where the one or more additives include at least one of an alkalinity adjuster, a viscosifier, a shale inhibitor, a fluid loss control agent, or a weighting agent.

A twenty-seventh aspect of the present disclosure may include any of the twenty-first through twenty-sixth aspects where the water-based drilling fluid includes the aqueous base fluid in an amount of from 25 vol. % to 99 vol. % relative to the total volume of the water-based drilling fluid.

A twenty-eighth aspect of the present disclosure may include any of the twenty-first through twenty-seventh aspects where the water-based drilling fluid includes the one or more additives in an amount of from 0.1 vol. % to 75 vol. % relative to the total volume of the water-based drilling fluid.

In a twenty-ninth aspect of the present disclosure, a method of producing a water-based drilling fluid may include processing jojoba oil to produce a lesser melting point fraction of jojoba oil and mixing an aqueous base fluid, one or more additives, and the lesser melting point fraction of jojoba oil to produce the water-based drilling fluid. At least 90% of the lesser melting point fraction of jojoba oil may have a melting point less than or equal to 15° C.

A thirtieth aspect of the present disclosure may include the twenty-ninth aspect further including introducing the water-based drilling fluid into a subterranean formation.

A thirty-first aspect of the present disclosure may include the thirtieth aspect further including operating a drill in the subterranean formation in the presence of the water-based drilling fluid.

It should now be understood that various aspects of the water-based drilling fluid compositions and methods for drilling subterranean wells are described and such aspects may be utilized in conjunction with various other aspects.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A water-based drilling fluid comprising:
an aqueous base fluid;
one or more additives; and
a lesser melting point fraction of jojoba oil in an amount of from 0.1 vol. % to 10 vol. % relative to the total volume of the water-based drilling fluid, where at least 90% of the lesser melting point fraction of jojoba oil has a melting point less than or equal to 15° C.; wherein the lesser melting point fraction of jojoba oil comprises at least oleic acid and palmitoleic acid; and
wherein one or both of:
the lesser melting point fraction of jojoba oil comprises oleic acid in an amount of from 75 vol. % to 99 vol. % relative to the total volume of the lesser melting point fraction of jojoba oil; or
the lesser melting point fraction of jojoba oil comprises palmitoleic acid in an amount of from 1 vol. % to 25 vol. % relative to the total volume of the lesser melting point fraction of jojoba oil.

2. The water-based drilling fluid of claim 1, where the lesser melting point fraction of jojoba oil comprises oleic acid in an amount of from 75 vol. % to 99 vol. % relative to the total volume of the lesser melting point fraction of jojoba oil.

3. The water-based drilling fluid of claim 1, where the lesser melting point fraction of jojoba oil comprises palmitoleic acid in an amount of from 1 vol. % to 25 vol. % relative to the total volume of the lesser melting point fraction of jojoba oil.

4. The water-based drilling fluid of claim 1, where the molar ratio of oleic acid to palmitoleic acid is from 25:1 to 50:1.

5. The water-based drilling fluid of claim 1, where the water-based drilling fluid comprises the aqueous base fluid in an amount of from 25 vol. % to 99 vol. % relative to the total volume of the water-based drilling fluid.

6. The water-based drilling fluid of claim 1, where the water-based drilling fluid comprises the one or more additives in an amount of from 0.1 vol. % to 75 vol. % relative to the total volume of the water-based drilling fluid.

7. A method of drilling a subterranean well, the method comprising:
operating a drill in a subterranean formation in the presence of a water-based drilling fluid, where the water-based drilling fluid comprises:
an aqueous base fluid;
one or more additives; and
a lesser melting point fraction of jojoba oil in an amount of from 0.1 vol. % to 10 vol. % relative to the total volume of the water-based drilling fluid, where at least 90% of the lesser melting point fraction of jojoba oil has a melting point less than or equal to 15° C.; wherein the lesser melting point fraction of jojoba oil comprises at least oleic acid and palmitoleic acid; and
wherein one or both of:
the lesser melting point fraction of jojoba oil comprises oleic acid in an amount of from 75 vol. % to 99 vol. % relative to the total volume of the lesser melting point fraction of jojoba oil; or
the lesser melting point fraction of jojoba oil comprises palmitoleic acid in an amount of from 1 vol. % to 25 vol. % relative to the total volume of the lesser melting point fraction of jojoba oil.

* * * * *